United States Patent [19]

Baumgarten

[11] Patent Number: 5,575,516
[45] Date of Patent: Nov. 19, 1996

[54] FASTENING MECHANISM FOR A HANDLE

[75] Inventor: Gerd-Diethard Baumgarten, Wilnsdorf-Wilden, Germany

[73] Assignee: Heinrich Baumgarten KG Spezialfabrik fuer Beschlagteile, Neunkirchen, Germany

[21] Appl. No.: 432,095

[22] Filed: May 1, 1995

[30] Foreign Application Priority Data

Nov. 22, 1994 [DE] Germany .............................. 9418644 U

[51] Int. Cl.⁶ ...................................................... E05B 3/00
[52] U.S. Cl. ............... 292/353; 16/114 A; 292/DIG. 27; 292/348
[58] Field of Search .................................. 292/348, 352, 292/353, 354, DIG. 27; 16/114 A, 110 A; 411/347

[56] References Cited

U.S. PATENT DOCUMENTS

| | | | |
|---|---|---|---|
| 1,015,176 | 1/1912 | Hall | 16/114 A |
| 2,501,940 | 3/1950 | Hibbard | 16/114 A |
| 3,272,547 | 9/1966 | Pryce | 16/114 A |
| 3,306,647 | 2/1967 | Imhoff | 16/114 A |
| 3,648,887 | 3/1972 | Hartley | 16/114 A |
| 3,883,169 | 5/1975 | Fischbach | 16/114 A |
| 4,577,367 | 3/1986 | Durand | 16/114 A |

FOREIGN PATENT DOCUMENTS

| | | |
|---|---|---|
| 1256850 | 7/1968 | Germany . |
| 1429912 | 11/1968 | Germany . |
| 1934241 | 1/1970 | Germany . |
| 2264244 | 10/1974 | Germany . |
| 2501404 | 7/1976 | Germany . |
| 9315144 | 3/1994 | Germany . |
| 9405597 | 7/1994 | Germany . |
| 548190 | 4/1974 | Switzerland . |
| 979233 | 1/1965 | United Kingdom ............... 292/353 |
| 1442676 | 7/1976 | United Kingdom ............... 16/110 A |

Primary Examiner—Darnell M. Boucher
Attorney, Agent, or Firm—Flynn, Thiel, Boutell & Tanis, P.C.

[57] ABSTRACT

A fastening mechanism for a handle on a cooking utensil should also have a releasable design for certain uses, for example, when the cooking utensil is heated up in a closed oven. A release and subsequent reconnection of a handle thereby should be done quickly and without effort, and the fastening mechanism for the handle moreover should be easy to manufacture. The fastening mechanism uses for this purpose an operating piece, which can be adjusted transversely with respect to the longitudinal extent of a handle piece in such a fastening mechanism. During the handling of which operating piece, a locking of the handle piece on a holding piece is released, which handle piece is covered by the handle piece and is connected to the cooking utensil. A renewed slipping over of the handle piece occurs against a light resiliency resulting from a transfer slope on a spring piece which also is used for the locking.

23 Claims, 1 Drawing Sheet

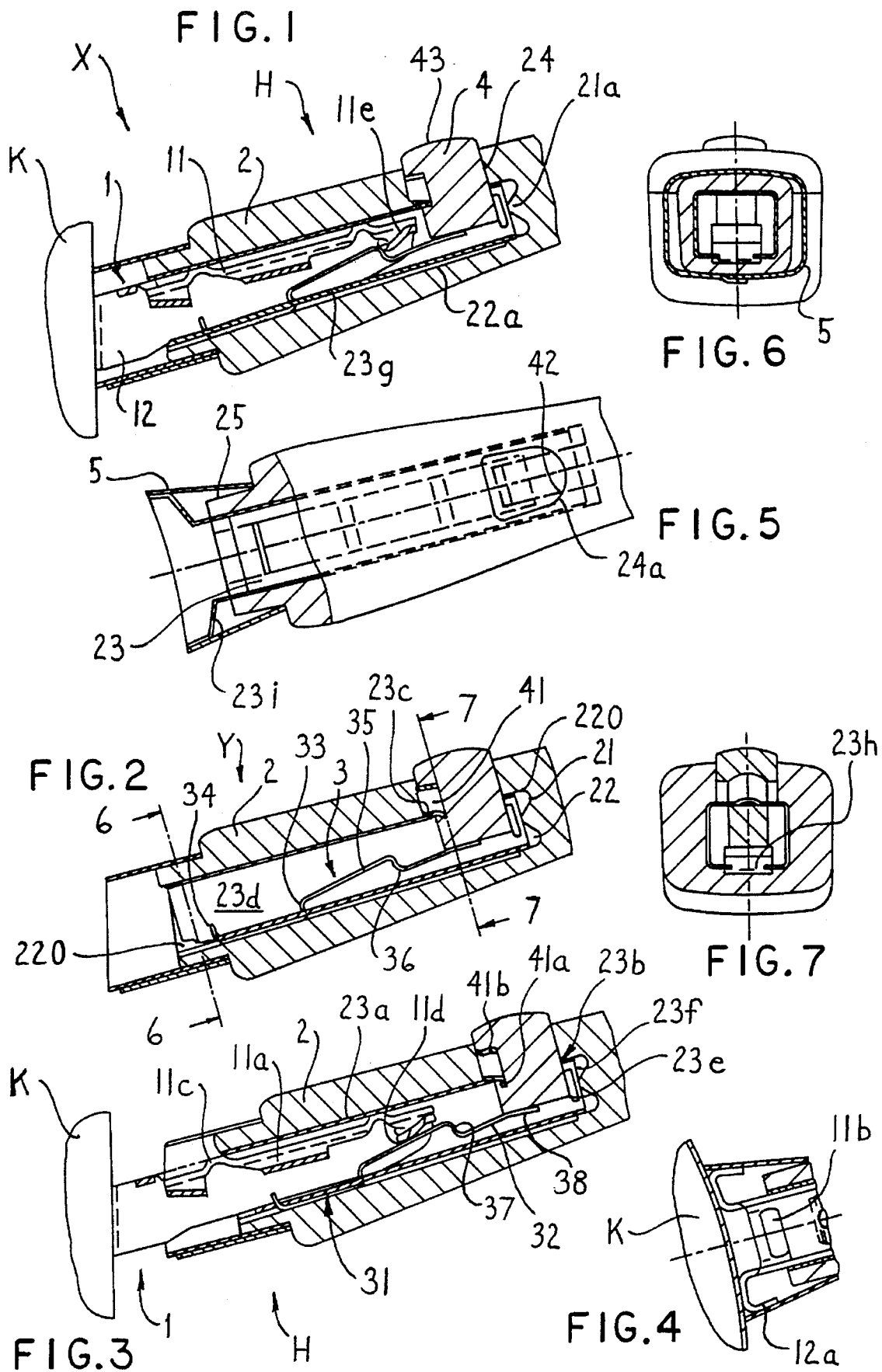

FASTENING MECHANISM FOR A HANDLE

FIELD OF THE INVENTION

The invention relates to a fastening mechanism of a handle for locking a handle piece in its position of use on a cooking utensil or the like, for example, on a cooking pot or a frying pan which includes a metallic holding piece. The holding piece is preferably nonreleasably provided or fixed on the cooking utensil, projects peglike therefrom and is covered by the handle piece which handle piece has a recess. The handle piece also comprises a spring piece fastened in the recess which extends along said recess and is able to be coupled with the holding piece. The spring piece is automatically and positively lockable on the holding piece when the handle piece is moved over the holding piece and then engages the holding piece in its position of use.

BACKGROUND OF THE RELATED ART

Such a fastening mechanism for a handle is already known from the patent, DE 22 64 244 A1. This fastening mechanism is suited to press the handle piece with an initial tension on the cooking utensil and to eliminate in this manner any type of clearance between the structural elements of the fastening mechanism so that this fastening mechanism can be manufactured relatively easily, and thus a secure connection is guaranteed between the handle piece and the holding piece. On the other hand, however, it is difficult to release.

However, it is instead desired in many cases to be able to easily remove and again fasten the handle piece to and from the holding piece as desired. Thus, for example, it is practical when the handle pieces can be removed from the associated cooking utensil which utensil is supposed to be used in a heated oven, because the cooking utensil can then be easily removed with the handle pieces without any further auxiliary means from the oven, which handle pieces again have been mounted on the holding pieces but, however, have not been heated.

Easily releasable fastening mechanisms for a handle have been known for a long time.

Further, a removable handle has been described in the patent, DE 1 256 850, in which a nonmovable handle part is combined with a movable, rotatable handle part and a clamping device is clamped or released during the rotary movement, with the help of which clamping device the handle is fastened on the associated cooking utensil. Such a fastening mechanism is complicated because it demands both hands during the fastening or release of the handle. It is also complicated in design, and the producible torque remains low so that the fastening mechanism is not secure or safe.

A slightly simpler construction is described in the patent, DE 1 429 912. A releasable handle is thereby provided with a sliding piece, which can be moved into and can be locked in a complementary counterpiece fastened on the cooking utensil. Here one hand is sufficient for handling the fastening mechanism both during the release and also during the locking of the handle. However, a clearance-free locking, which is secure under initial tension, is not possible. The mounting of the handle, for example, in a heated oven is complicated because the sliding piece must be threaded into the counterpiece.

The patent, DE 1 934 241 shows a handle, which can be fastened on a holding piece by means of a catch, which is stationarily provided on a cooking utensil and has at least one flexible leg and which can be bent open under a bending force applied to the handle with the catch being released. A bending force is needed in the same manner when the separated handle is again supposed to be locked. The more secure the locking of the catch is supposed to be, the greater must be the necessary bending force such that connecting the handle, for example, in a heated oven, cannot be done sufficiently quickly because of the necessary bending force and the complicated suspension of the handle which is disadvantageous.

A further releasable fastening mechanism is disclosed in the patent, CH 548 190. The associated handle can be fastened on a flange edge which is constructed on the cooking utensil such that a locking member of the handle extends through a hole in this flange edge and the locking member can be locked with frictional resistance. This simple arrangement requires a considerable operating force for a somewhat secure locking, which operating force cannot be produced by a user who lacks sufficient strength.

Therefore the purpose of the invention is to construct a fastening mechanism for a handle of the above-identified type in such a manner that it can be easily released and again be locked clearance-free with little force by one hand, and that thereby consists of parts, which can be easily assembled.

SUMMARY OF THE INVENTION

The purpose is attained according to the invention in such a manner that in the handle piece there is provided an opening transverse with respect to its longitudinal extent and ending in the recess, in which opening, there is supported an operating piece mounted on the handle piece which is movable in a direction of the recess.

The operating piece is movable during gripping of the handle piece preferably with the thumb of a user, with which operating piece the spring piece can be biased and can thereby be unlocked from the holding piece to cancel the positive locking effect provided thereby. The locking of the spring piece on the holding piece can be interrupted with the invention, and the handle piece can be easily pulled off from the holding piece.

The spring piece consists advantageously of a holding leg and a flexible leg and is stationarily held with its holding leg opposite the opening. The flexible leg is designed as a one-arm lever with a first locking element which creates the locking effect by cooperating with a second locking element constructed on the holding piece. Because the operating piece is moved transversely with respect to the longitudinal extent of the handle piece and also the spring piece extends longitudinally in the recess, a small operating force on the operating piece is sufficient in order to release the locking engagement.

Also the refastening of the handle piece does not create any difficulties whatsoever and takes place with little effort, in particular when a sloped section is provided on the flexible leg. The sloped section is in contact with a transverse shoulder of the holding piece when the handle piece is moved thereon, and thereby swings the flexible leg against the resulting rising spring force and increasingly out of the rest position until its locking element falls into the locking element on the holding piece under the influence of the spring force. The participating forces can be designed through the geometric construction of the spring piece and of the locking elements in such a manner that in spite of the small amount of force input, a clearance-free positive locking engagement occurs.

It is advantageous when the flexible leg can be loaded at its free end piece by means of the operating piece. In this manner even a repeated release of the handle piece can be easily carried out and requires only a small amount of force. Thus both operations are extraordinarily user friendly.

A particularly advantageous embodiment of the fastening mechanism of the invention has the recess of the handle piece lined at least partially in its longitudinal extent by a metallic, tube-shaped sleeve which is stationarily locked in the recess. The recess has an essentially rectangular cross section such that the sleeve also corresponds to this cross section. A relative movement of the sleeve on the metallic holding piece during the mounting and removal of the handle piece is therefore wear-resistant so that a long life is guaranteed even during frequent mounting and removal.

The sleeve can be easily introduced into the recess of the handle piece when it has a continuous longitudinal slot, lying opposite the opening, over its entire length which is preferably designed lightly resiliently. The spring piece can thereby be stationary with respect to the cross section of the sleeve when the recess is formed with a longitudinal groove in a side of its wall which is opposite the opening, into which longitudinal groove the holding leg of the spring piece can be placed and can be locked transversely with respect to the longitudinal extent of the handle piece by the adjoining wall pieces in the wall of the sleeve. The wall pieces are separated by the longitudinal slot and at least partially cover the holding leg. However, also in direction of this longitudinal extent, it is possible for the spring piece to be secured in position when it has a bent section between the holding leg and the flexible leg and the sleeve has transverse slots in its wall opposite the opening and transverse with respect to the longitudinal extent of the handle piece and further when at least the bent section is arranged in such a manner in one of the transverse slots such that the spring piece is stationarily locked in the sleeve in the direction of the longitudinal extent of the handle piece. The position can further be secured by the spring piece being bent into a flat piece at its end remote from the operating piece and erected projecting from the flat holding piece. The flat piece is arranged in a further one of the transverse slots, and in turn itself stationarily locks the spring piece in the sleeve in the direction of the longitudinal extent of the handle piece.

The spring piece and the sleeve can be formed in a simple manner entirely by stamping and bending or rather by extrusion so that a high manufacturing exactness does not cause any difficulties. Also the assembly of the parts with the handle piece can occur without any auxiliary help and separate fastening mechanisms and consequently, special know-how is not needed for these operations.

If necessary, the completely premounted sleeve can be easily locked in the longitudinal direction in the recess of the handle piece when it has a locking piece in the area of the opening of the handle piece which is created out of the sleeve through a notch, a bent section or other formation, which locking piece springs back during moving of the sleeve into the recess and thereafter falls barblike into the opening, such that the locking piece can fall into the opening when the sleeve hits the front wall of the recess. The sleeve can then no longer be easily removed from the recess and the locking piece would have to be pressed using a suitable tool through the opening out of its area. Otherwise, a secure fit in the handle piece is guaranteed, in particular when the sleeve rests resiliently on the front wall of the recess and rests with the locking piece on the opening with a corresponding initial tension. For this purpose, the sleeve can have in a simple manner at least one resilient cross-web in the area of the front wall of the recess, which is supported on a bearing web formed so as to project at the front wall. It is easiest when the cross-web is formed by a slot in the sleeve. Also in this manner the sleeve can be mounted under an initial tension in the recess, which initial tension is applied by the resiliency of the cross-web onto the locking piece resting in the opening and the wall of the opening.

Care must be taken that the operating piece is well guided and securely arranged in the recess when the fastening mechanism of the invention is completed.

This can be done advantageously, for example, by the sleeve having an opening for the operating piece which is positioned in the area of the opening of the handle piece when the sleeve is locked in the recess, by the operating piece furthermore having a front-side guiding groove extending transversely with respect to its stroke and being directed toward and gripping over the locking piece, and by a first shoulder of the guiding groove resting under the influence of the spring piece on the operating piece on one side of the locking piece and a second shoulder of the guiding groove resting on its other side when the operating piece is operated. The second shoulder limits its stroke with the spacing between the shoulders being chosen such that the unlocking of the locking elements is made possible through the stroke of the operating piece without any difficulties.

The guiding of the operating piece can be further improved when there are provided lateral guiding grooves on this operating piece extending in the direction of its stroke, which serve to grip over bent sections, beads or the like that are parallel to said guiding grooves in the adjacent walls of the sleeve and can be easily shifted movably in said guiding grooves.

The fastening mechanism for a handle according to the invention is complete when the handle piece covers incompletely only the holding piece and a spacer sleeve is provided between the handle piece and the cooking utensil, which dresses the free part of the holding piece. The spacer sleeve thereby assures at the same time that the locking engagement of the handle piece on the holding piece cannot be exceeded but that both parts are clearly associated with one another. The spacer sleeve can be connected both to the handle piece and also to the holding piece. Accordingly, either the holding plates, on which holding plates the spacer sleeve is fastened, are provided on the sleeve or instead are fastened on the holding piece. The spacer sleeve can thereby be very easily fastened with frictional resistance, in particular when it is designed as a closed hollow profile.

The handle piece and/or the operating piece are formed advantageously of a plastic with an insulating character or of metal.

The metallic holding piece, which is, for example, fixedly riveted or welded to the cooking utensil, is best designed with a U-shaped cross section, with holding noses being constructed on the connecting web thereof, which holding noses rest on a wall of the sleeve and serve to lock the holding piece tight-fittingly when the belts, which are bent away from the web, rest on the oppositely lying, slotted wall of the sleeve.

The aforesaid purposes are attained by the invention in a surprisingly simple manner while keeping the classlike simple design of such a handle fastening mechanism. One single additional and simply designed structural part, namely the operating piece, is needed for the fastening mechanism of the invention, with the assembly of the arrangement continuing to be very simple. The operation, that is, the release of the handle piece from the cooking utensil, can thereby also be carried out very simply, easily and quickly and can be repeated as often as desired because the arrangement is not exposed to any noticeable wear.

BRIEF DESCRIPTION OF THE DRAWINGS

The invention will be discussed in greater detail hereinafter in connection with a preferred embodiment and the drawings, in which:

FIG. 1 shows a fastening mechanism for a handle according to the invention which is locked in place on a cooking utensil;

FIG. 2 shows a handle piece of an unlocked fastening mechanism, which handle piece has been released from the cooking utensil;

FIG. 3 shows the fastening mechanism for the handle corresponding to FIG. 1 during the relocking of the released handle piece;

FIG. 4 is a partial cross sectional view as viewed in the direction of arrow X of FIG. 1;

FIG. 5 is a partial view in cross section as viewed in the direction of arrow Y of FIG. 2;

FIG. 6 is a cross-sectional view as viewed in the direction of arrows A—A of FIG. 2 in a schematically simplified illustration; and FIG. 7 is a cross-sectional view as viewed in the direction of arrows B—B of FIG. 2 in a schematically simplified illustration.

DETAILED DESCRIPTION

Referring to FIGS. 1 to 3, a fastening mechanism of a handle H on a cooking utensil K according to the invention includes a holding piece 1 which is nonreleasably fastened on the cooking utensil K and projects peglike therefrom. The fastening mechanism further includes a handle piece 2 covering the holding piece 1, which handle piece is releasably fastened through a catch thereon on the holding piece 1 by means of a spring piece 3, and an operating piece 4 movably provided in the handle piece 2. With the help of which operating piece 4, the catch of the handle piece 2 on the holding piece 1 can be released and the handle piece 2 can be removed from the cooking utensil K.

The holding piece 1 has an essentially U-shaped cross section, a web 11 of which, which web 11 lies on top, has several depressions 11a and is interrupted by notches 11b (as illustrated in FIG. 4). Impressed holding noses 11c in connection with belts 12 which are canted from the web 11 ensure that the handle piece 2 sits clearance-free on the holding piece 1 in a first direction. The belts 12 are spaced far enough from one another so that a clearance is also not possible in a second direction, which is perpendicular with respect to the first one. The pulled-in transverse shoulder 11e provided at the free end of the holding piece 1 also forms a second locking element 11d for locking of the spring piece 3. The holding piece 1 is fastened on the cooking utensil K by means of spot welding or riveting wherein the ends of the belts 12 are on the side of the cooking utensil bent several times for this purpose so that they form support plates 12a.

The handle piece 2 is formed of a plastic and has a center recess 22 extending along the handle piece 2 to a front wall 21, which recess 22 covers almost the entire holding piece 1 when the handle piece 2 is in an operating condition (as illustrated in FIG. 1). The wall 220 of the recess 22 is approximately rectangular in cross section and at least correspond to the cross section of the holding piece 1 and thereby does not directly rest on the holding piece 1. Rather, the recess 22 is lined with a thin-wall, metallic sleeve 23. The sleeve 23 contacts the web 11 and the belts 12 of the holding piece 1 continuously throughout and also is designed holohedrally.

An opening 24 extending from the outside into the recess 22 is provided on the shaft of the handle piece 2 so that the operating piece 4 can be movable transversely with respect to the recess 22 in the opening 24 and can be provided such that it can be easily operated by the thumb of the hand gripping the handle piece 2. FIG. 1 shows clearly that when the handle piece 2 is locked or engaged, the holding piece 1 ends in front of the opening 24. As seen in FIG. 1, an upper wall 23a of the sleeve 23 has an opening 23b at this point, from which a locking piece 23c is folded off so far that it is resiliently supported by the wall 220 when the sleeve 23 is moved into the recess 22 and the sleeve 23 locks in the handle piece 2 when it falls into the opening 24.

Lateral guiding grooves can be provided, which are guided through corresponding bent sections, beads or the like in the adjacent walls 23d of the sleeve 23 so that the operating piece 4 experiences a multiple guiding in its direction of operation.

Slots 23e, which are parallel with respect to the front wall 21, are stamped into the sleeve 23 in the walls 23d at its end adjacent to the front wall 21 in the recess 22. The slots 23e each leave a cross-web 23f, which is dimensioned such that the sleeve 23 can hit during an axial stroke thereof a support web 21a of the front wall 21. The arrangement is such that such a stroke occurs when the locking piece 23c falls into the opening 24. The sleeve 23 is in this manner locked with an initial tension in the recess 22.

The locking piece 23c, in connection with a guiding groove 41 on the front side of the operating piece 4, furthermore serves the purpose of limiting its stroke and being fixedly arranged in the handle piece 2. FIG. 7 shows that the guiding groove 41 is designed approximately with the width of the locking piece 23c. Its maximum height is limited by a first shoulder 41a in the guiding groove 41 so that the handle piece 2 can be locked on the holding piece 1, whereas a second shoulder 41b enables its release. A rear part 42 of the operating piece 4 is designed as a semicircular cylinder and is thus easily movably guided on a correspondingly formed back wall 24a of the opening 24. A handling surface 43 of the operating piece 4 is spherically designed for a comfortable handling by a user.

A lower wall 23g of the sleeve 23 opposite the opening 23b is divided (as illustrated by FIGS. 6 and 7) by a center, continuous longitudinal slot 23h formed therethrough so that the sleeve 23 can be anchored along its entire longitudinal extent with an easy initial tension and thus, is clearance-free or tight-fittingly received in the recess 22. Below the lower wall 23g, there is provided a flat longitudinal groove 22a which is used to receive a holding leg 31 of the spring piece 3, which rests therein and on which a movable flexible leg 32 is canted. The longitudinal groove 22a is wider than the longitudinal slot 23h and is adapted to correspond to the width of the holding leg 31 so that the spring piece 3 is not movable transversely with respect to the longitudinal groove 22a. The associated first bent section 33 is transversely positioned in the spring piece 3, which as a whole extends longitudinally, and penetrates through the wall 23g in a fitting first transverse slot (not visible in the drawing) so that the spring piece 3 also is stationarily locked in its longitudinal direction on the handle piece 2. A second transverse slot (not illustrated) is provided for a flat piece 34 erected at the free end of the holding leg 31, which flat piece is used to further secure the position of the spring piece 3.

The bent section 33 is followed at the flexible leg 32 by a sloped section 35. When the handle piece 2 is moved onto said sloped section 35 (as seen in FIG. 3), the sloped section 35 bends the flexible leg 32 at the transverse shoulder 11e and about the bent section 33 so as to be initially tensioned outwardly away from the shoulder 11e until a first locking element 37, which is formed by a further bent section 36 and follows the sloped section 35, falls into the second locking element 11d and the handle piece 2 thus engages the holding piece 1. Both bent sections 33 and 36 are Z-shaped whereby the second bent section 36 thereby transforms into an end piece 38 resiliently resting on the operating piece 4.

Between the cooking utensil K and the handle piece 2 there remains a part of the holding piece 1 which is not covered by the handle piece 2. It is covered by a tube-shaped spacer sleeve 5 manufactured out of an overlapped sheet metal (as illustrated in FIG. 6). The spacer sleeve 5 can be fastened both on the holding piece 1 and also on the handle piece 2. However, it is also possible that the spacer sleeve 5 is fastened through a mere frictional resistance on one of the two structural elements 1 or 2 so that it is not lost during the release of the handle piece 2. Thus it can be moved, for example, lightly resiliently onto a holding flange 25 formed on the handle piece 2, as this is done in the embodiment of FIGS. 1, 2 and 6. However, it is also possible to fasten the spacer sleeve 5 on holding plates 23i of the sleeve 23 (see FIG. 5) or on the support plates 12a, with which the holding piece 1 is fastened to the cooking utensil K (as illustrated in FIG. 4).

The embodiments of the invention in which an exclusive property or privilege is claimed are defined as follows:

1. In a fastening mechanism for a handle for locking a handle piece in a position of use on a cooking utensil, said fastening mechanism having a metallic holding piece non-releasably provided on the cooking utensil and projecting outwardly therefrom, said handle including a handle piece which has a recess for receiving said holding piece, and a spring piece which is fastened in said recess, extends along said recess, and is able to be coupled with said holding piece, said spring piece being automatically and positively lockable on said holding piece when said handle piece is moved over said holding piece and locks said handle piece to said holding piece in said position of use, comprising the improvement wherein an opening is provided in said handle piece and extending transversely with respect to a longitudinal extent of said handle piece and ending in said recess, wherein, in said opening, there is provided an operating piece secured to said handle piece and is supported for movement in said transversely extending opening in response to a gripping of said handle piece by a digit of a user's hand, with which operating piece said spring piece is biased and thereby unlocked from said holding piece to cancel the positive locking of said spring piece on said holding piece, and wherein a metallic tubular sleeve is stationarily fixed in said recess to thereby protectively line said recess, said sleeve including means for locking said spring piece in said recess.

2. The fastening mechanism according to claim 1, wherein said spring piece comprises a holding leg and a flexible leg, the spring piece being stationarily held with said holding leg opposite said opening, and said flexible leg being formed as a one-arm lever with a first locking element creating the positive locking by cooperating with a second locking element constructed on said holding piece.

3. The fastening mechanism according to claim 2, wherein a sloped section is provided on said flexible leg, said sloped section being in contact with a transverse shoulder of said holding piece when said handle piece is moved thereon, and said sloped section thereby swinging said flexible leg increasingly out of a rest position against an increasing spring force until said first locking element falls into said second locking element on said holding piece under the influence of said spring force.

4. The fastening mechanism according to claim 2, wherein the flexible leg can be loaded at a free end piece thereof by means of the operating piece.

5. The fastening mechanism according to claim 2, wherein said recess has an essentially rectangular cross section.

6. The fastening mechanism according to claim 2, wherein said sleeve has a continuous longitudinal slot therein extending over an entire length of the sleeve opposite said opening and which is formed so as to be lightly resilient.

7. The fastening mechanism according to claim 6, wherein said recess has a longitudinal groove in a side of a wall thereof opposite said opening, and said holding leg of said spring piece being placeable in the longitudinal slot and being transversely lockable with respect to the longitudinal extent of said handle piece by said means for locking which includes adjoining wall pieces in the wall of said sleeve, said wall pieces being separated by said longitudinal slot and at least partially covering the holding leg.

8. The fastening mechanism according to claim 5 wherein said spring piece has a bent section between said holding leg and said flexible leg, wherein said means for locking, said sleeve has transverse slots in a wall opposite said opening and positioned transversely with respect to the longitudinal extent of said handle piece, and wherein at least said bent section is arranged in such a manner in one of the transverse slots that said spring piece is stationarily locked in said sleeve in the direction along the longitudinal extent of said handle piece.

9. The fastening mechanism according to claim 8 wherein the spring piece is bent at an end thereof remote from the operating piece into a flat piece erected so as to project from the flat holding piece, and the flat piece is arranged in a further one of the transverse slots which in turn stationarily locks the spring piece in the direction of the longitudinal extent of the handle piece in the sleeve.

10. The fastening mechanism according to claim 1, wherein said recess has a front wall at an end opposite the end receiving said holding piece, wherein the sleeve has a locking piece near said opening of said handle piece, said locking piece being formed out of said sleeve by a notch and a bent section which springs back during a movement of said sleeve into said recess and falls thereafter barblike into said opening, and wherein said locking piece can fall into said opening when said sleeve hits the front wall of the recess.

11. The fastening mechanism according to claim 10, wherein said sleeve has an opening therethrough for receiving said operating piece corresponding to said opening of said handle piece when it is locked in said recess, and wherein said operating piece has a guiding groove on a front-side thereof and extending transversely with respect to a stroke of said operating piece, said guiding groove being directed toward and gripping over said locking piece, a first shoulder of said guiding groove on one side of said locking piece resting under the influence of said spring piece on said operating piece and a second shoulder of said guiding groove resting on an other side thereof to limit a stroke of said operating piece when said operating piece is operated.

12. The fastening mechanism according to claim 11, wherein the distance between said first and second shoulders is such that said stroke of said operating piece allows an unlocking of said locking elements.

13. The fastening mechanism according to claim 1, wherein on said operating piece extending in a direction of a stroke of said operating piece there are provided lateral guiding grooves gripping over at least one of bent sections and beads extending parallel to said lateral guiding grooves in adjacent walls of said sleeve and are readily shiftedly movable in same said guiding grooves.

14. The fastening mechanism according to claim 10, wherein said sleeve rests resiliently on said front wall of said recess and rests with said locking piece with a corresponding initial tension on said opening.

15. The fastening mechanism according to claim 14, wherein said sleeve has near said front wall of said recess at least one resilient cross-web supported on a bearing web formed so as to project at said front wall.

16. The fastening mechanism according to claim 15, wherein said cross-web is formed by a slot in said sleeve.

17. The fastening mechanism according to claim 1, wherein said handle piece covers only incompletely said holding piece and a spacer sleeve is provided between said handle piece and said cooking utensil, which dresses said free part of said holding piece.

18. The fastening mechanism according to claim 17, wherein holding plates are provided on said metallic tubular sleeve, and said spacer sleeve is fastened to said holdings plates.

19. The fastening mechanism according to claim 17, wherein said spacer sleeve is fastened on said holding piece.

20. The fastening mechanism according to claim 17, wherein said spacer sleeve is fastened with frictional resistance.

21. The fastening mechanism according to claim 17, wherein said spacer sleeve has a closed hollow profile.

22. The fastening mechanism according to claim 1, wherein at least one of said handle piece and said operating piece are each formed of one of a plastic and a metal.

23. The fastening mechanism according to claim 1, wherein said holding piece is formed with a U-shaped cross section having a connecting web and side arms, with holding noses being constructed on the connecting web, which said holding noses rest on a wall of said sleeve and lock said holding piece when said side arms rest on an oppositely lying, slotted wall of said sleeve.

* * * * *